United States Patent
Hu

(10) Patent No.: US 12,158,676 B2
(45) Date of Patent: Dec. 3, 2024

(54) ARRAY SUBSTRATE AND DISPLAY DEVICE

(71) Applicant: GUANGZHOU CHINA STAR OPTOELECTRONICS SEMICONDUCTOR DISPLAY TECHNOLOGY CO., LTD., Guangdong (CN)

(72) Inventor: Xiaobin Hu, Guangdong (CN)

(73) Assignee: GUANGZHOU CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/759,369

(22) PCT Filed: Jun. 30, 2022

(86) PCT No.: PCT/CN2022/102586
§ 371 (c)(1),
(2) Date: Jul. 24, 2022

(87) PCT Pub. No.: WO2023/226146
PCT Pub. Date: Nov. 30, 2023

(65) Prior Publication Data
US 2024/0192557 A1    Jun. 13, 2024

(30) Foreign Application Priority Data

May 25, 2022  (CN) .......................... 202210578407.7

(51) Int. Cl.
*G02F 1/1343*  (2006.01)
*G02F 1/1333*  (2006.01)
*G02F 1/1362*  (2006.01)

(52) U.S. Cl.
CPC .. *G02F 1/136218* (2021.01); *G02F 1/133345* (2013.01); *G02F 1/134372* (2021.01); *G02F 1/136286* (2013.01)

(58) Field of Classification Search
CPC ......... G02F 1/136218; G02F 1/133345; G02F 1/136286
See application file for complete search history.

(56) References Cited

U.S. PATENT DOCUMENTS

2017/0285381 A1*  10/2017  Wang ................ G02F 1/134309
2022/0050342 A1   2/2022   Lin et al.

FOREIGN PATENT DOCUMENTS

| CN | 103676374 A | 3/2014 |
|---|---|---|
| CN | 104238207 A | 12/2014 |

(Continued)

OTHER PUBLICATIONS

Chinese Office Action issued in corresponding Chinese Patent Application No. 202210578407.7 dated Apr. 21, 2023, pp. 1-6.

(Continued)

*Primary Examiner* — James A Dudek
(74) *Attorney, Agent, or Firm* — PV IP PC; Wei Te Chung

(57) ABSTRACT

The present application provides an array substrate and a display device. By placing a first shielding electrode between the data line and the common electrode arranged opposite to each other, the first shielding electrode is connected to a DC voltage signal, so that a data voltage signal of the data line does not affect a signal of the common electrode. This prevents coupling capacitance between the common electrode and the data line, and prevents poor display quality like screen flickering.

14 Claims, 4 Drawing Sheets

(56) References Cited

FOREIGN PATENT DOCUMENTS

| CN | 104597670 A | 5/2015 |
| CN | 104698705 A | 6/2015 |
| CN | 104793416 A | 7/2015 |
| CN | 104916648 A | 9/2015 |
| CN | 105185791 A | 12/2015 |
| CN | 113985662 A | 1/2022 |

OTHER PUBLICATIONS

International Search Report in International application No. PCT/CN2022/102586, mailed on Nov. 30, 2022.
Written Opinion of the International Search Authority in International application No. PCT/CN2022/102586, mailed on Nov. 30, 2022.

\* cited by examiner

ARRAY SUBSTRATE AND DISPLAY DEVICE

FIELD OF DISCLOSURE

The present application relates to a technical field of display devices and in particular, to an array substrate and a display device.

DESCRIPTION OF RELATED ART

With the development of display manufacturing technology, liquid crystal display (LCD) technology has developed rapidly. Hence, LCDs have gradually replaced the traditional cathode-ray tube displays and become the mainstream of future flat panel displays. In the field of LCD technology, thin film transistor liquid crystal displays (TFT-LCDs) are widely used in televisions, computers, mobile phones, and other fields due to its advantages of large sizes, high integration, powerful functions, flexible processes, and low costs.

LCDs usually have display modes such as VA, IPS, TN, and FFS. Among them, the fringe field switching (FFS) display mode controls rotation of liquid crystals through a parallel electric field, and has relatively good viewing angles.

However, in the FFS display mode or the IPS display mode, a common electrode of the LCD generally overlaps with a data line, so a coupling capacitance is formed between the common electrode and the data line. As a result, data voltage signals in the data line affect signals of the common electrode and disturb the signals of the common electrode. When the signals of the common electrode fluctuate greatly, it is easy to cause poor display quality such as screen flickering of the liquid crystal display.

SUMMARY

The present application provides an array substrate and a display device, so as to solve a problem that interference in signals of a common electrode causes poor display quality of the display device.

In one aspect, the present application provides an array substrate, including:
a substrate;
a gate insulating layer disposed on the substrate;
a data line disposed on the gate insulating layer;
a first passivation layer disposed on the gate insulating layer and covering the data line;
a first shielding electrode disposed on the first passivation layer, wherein the first shielding electrode is connected to a direct current (DC) voltage signal output terminal;
a second passivation layer disposed on the first passivation layer and covering the first shielding electrode;
a common electrode disposed on the second passivation layer, wherein a portion of the common electrode overlaps with the data line and the first shielding electrode; and
a pixel electrode arranged in a same layer as the common electrode or arranged in stacked relation with the common electrode, and the pixel electrode is electrically insulated from the common electrode.

In the array substrate of the present application, a DC voltage signal of the DC voltage signal output terminal includes any one of a ground signal, a high-level signal, or a low-level signal, and the DC voltage signal is a signal that maintains a DC voltage within a frame period.

In the array substrate of the present application, an area of an orthographic projection of the first shielding electrode projected on the substrate covers an area of an orthographic projection of the data line projected on the substrate.

In the array substrate of the present application, the first shielding electrode is a plate-shaped electrode, and the pixel electrode is disposed on the first shielding electrode.

In the array substrate of the present application, the first shielding electrode is a strip-shaped electrode, the common electrode is disposed above the pixel electrode, and the first shielding electrode is disposed between the pixel electrode and the common electrode.

In the array substrate of the present application, the array substrate further includes:
a scan line disposed on the substrate and arranged under the gate insulating layer;
a second shielding electrode arranged between the scan line and the common electrode, wherein the scan line and the common electrode are electrically insulated from the second shielding electrode.

In the array substrate of the present application, the first shielding electrode and the second shielding electrode are disposed in a same layer.

In the array substrate of the present application, an orthographic projection of the first shielding electrode projected on the substrate and an orthographic projection of the second shielding electrode projected on the substrate cross each other.

In the array substrate of the present application, a thickness of the first shielding electrode ranges from 500 angstroms to 600 angstroms.

In the array substrate of the present application, a thickness of the second shielding electrode ranges from 500 angstroms to 600 angstroms.

In the array substrate of the present application, the first shielding electrode and the second shielding electrode are made of at least one of copper, indium tin oxide, or indium gallium oxide.

In the array substrate of the present application, the first shielding electrode and the second shielding electrode are formed by a sputtering process.

In another aspect, the present application provides a display device, including an array substrate, a liquid crystal layer, and a color filter substrate, wherein the liquid crystal layer is disposed between the array substrate and the color filter substrate, and the array substrate is the array substrate mentioned above.

In the display device of the present application, the DC voltage signal of the DC voltage signal output terminal includes any one of a ground signal, a high-level signal, or a low-level signal, and the DC voltage signal is a signal that maintains a DC voltage within a frame period.

In the display device of the present application, an area of an orthographic projection of the first shielding electrode projected on the substrate covers an area of an orthographic projection of the data line projected on the substrate.

In the display device of the present application, the first shielding electrode is a plate-shaped electrode, and the pixel electrode is disposed above the first shielding electrode.

In the display device of the present application, the first shielding electrode is a strip-shaped electrode, the common electrode is disposed on the pixel electrode, and the first shielding electrode is disposed between the pixel electrode and the common electrode.

In the display device of the present application, the array substrate further includes:

a scan line disposed on the substrate and arranged under the gate insulating layer; and a second shielding electrode arranged between the scan line and the common electrode, wherein the scan line and the common electrode are electrically insulated from the second shielding electrode.

In the display device of the present application, the first shielding electrode and the second shielding electrode are disposed in a same layer.

In the display device of the present application, an orthographic projection of the first shielding electrode projected on the substrate and an orthographic projection of the second shielding electrode projected on the substrate cross each other.

Advantages of the Present Application

In the array substrate and the display device of the present application, the gate insulating layer, the first passivation layer, and the second passivation layer are arranged to electrically insulate the data line, the common electrode, and the first shielding electrode from each other. A portion of the common electrode overlaps with the data line and the first shielding electrode, so that the first shielding electrode is formed between the data line and the common electrode disposed opposite to each other. The first shielding electrode is connected to the DC voltage signal output terminal, so that the first shielding electrode is connected to the DC voltage signal. Through a shielding effect of the first shielding electrode on the data line, a weak electric field or no electric field is formed between the first shielding electrode and the common electrode, which is beneficial to prevent coupling capacitance between the common electrode and the data line. Accordingly, the data voltage signal of the data line does not affect a signal of the common electrode. No matter how the data voltage signal changes, voltage in every position of the plate-shaped common electrode can always be maintained the same, which is beneficial to maintain the uniformity of the voltage of the common electrode and prevents corresponding liquid crystals above the data line from constantly rotating and deflecting to cause screen flickering as the voltage of the common electrode changes.

DETAILED DESCRIPTION OF EMBODIMENTS

Figure 1:
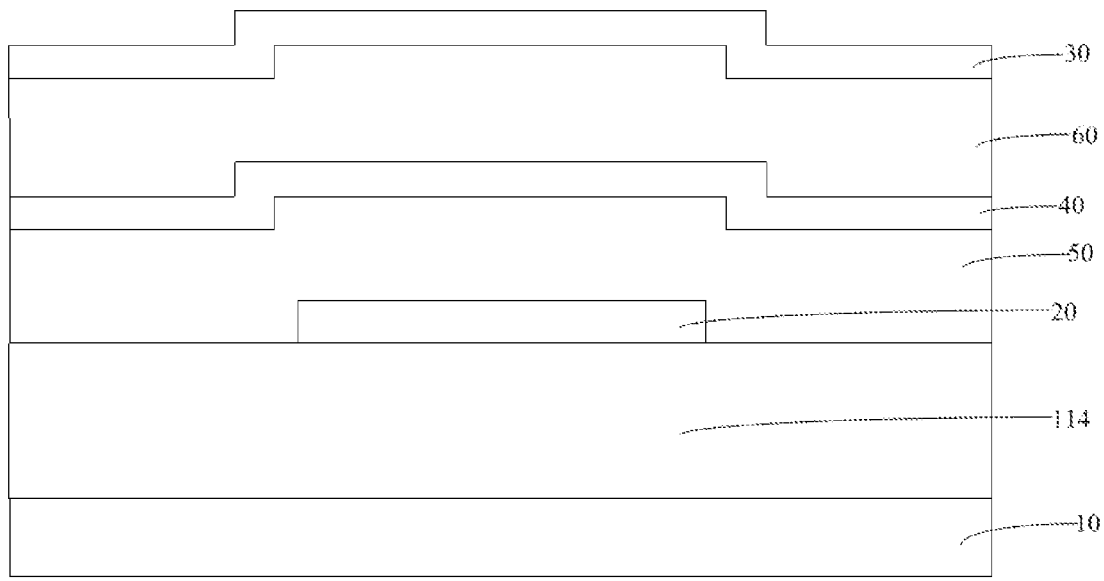
FIG. 1 is a schematic cross-sectional view of an array substrate according to one embodiment of the present application.

The technical solutions of the present application are clearly and completely described below with reference to the accompanying drawings and in conjunction with specific embodiments of the present application. Obviously, the described embodiments are only some of the embodiments of the present application, but not all of the embodiments. Based on the embodiments of the present application, all other embodiments obtained by those skilled in the art without creative efforts shall fall within the protection scope of the present application.

In the present disclosure, it should be understood that the terms "first" and "second" can expressly or implicitly include one or more of said features. In the present disclosure, "multiple" means two or more, unless otherwise expressly and specifically defined. It should be noted that, unless otherwise expressly specified and defined, the terms "coupled" and "connected" should be understood in a broad sense. For example, it can mean direct connection or indirect connection through an intermediate medium, or it can mean internal communication or interaction between two elements. For those of ordinary skill in the art, the specific meanings of the above terms in this application can be understood on a case-by-case basis.

The following description provides many different embodiments or examples for realizing different structures of the present application. To simplify the present disclosure, components and arrangements are described by specific examples below. Certainly, they are only examples and are not intended to limit the present application. Furthermore, reference numerals and/or reference letters can repeat in different examples for the purpose of simplicity and clarity, but the repetition does not indicate a relationship between various embodiments and/or between various arrangements discussed. In addition, the present application provides examples of various specific processes and materials, but one of ordinary skill in the art can be inspired to use other processes and/or other materials.

The present application provides an array substrate and a display device, which are described in detail below.

Referring to FIG. 1 to FIG. 7, the present application provides an array substrate, including a substrate 10, a gate insulating layer 114, a data line 20, a first passivation layer 50, a first shielding electrode 40, and a second passivation layer 60, a common electrode 30, and a pixel electrode 70.

The gate insulating layer 114 is disposed on the substrate 10. The substrate 10 can be a transparent flexible substrate 10 such as polyimide and polysiloxane, or can be a transparent rigid substrate 10 such as glass or plastic; however, the present application is not limited in this regard.

The data line 20 is disposed on the gate insulating layer 114. The first passivation layer 50 is disposed on the gate insulating layer 114. The first passivation layer 50 covers the data line 20. The first shielding electrode 40 is disposed on the first passivation layer 50. The second passivation layer 60 is disposed on the first passivation layer 50 and covers the first shielding electrode 40. The common electrode 30 is disposed on the second passivation layer 60, and a portion of the common electrode 30 overlaps with the data line 20 and the first shielding electrode 40. Specifically, the data line 20, the common electrode 30, and the first shielding electrode 40 can be electrically insulated from each other by using an insulating film layer such as a passivation layer. Specifically, the first passivation layer 50 is disposed between the data line 20 and the first shielding electrode 40, and the first passivation layer 50 is disposed between the first shielding electrodes 40.

The common electrode 30 is disposed above the data line 20, and the data line 20 and the common electrode 30 are disposed opposite to each other. The common electrode 30 is a plate-shaped electrode. The first shielding electrode 40 is disposed between the data line 20 and the common electrode 30. The data line 20, the common electrode 30, and the first shielding electrode 40 are electrically insulated from each other. The first shielding electrode 40 is connected to a direct current (DC) voltage signal output terminal. That is to say, the first shielding electrode 40 is used to connect a DC voltage signal.

The pixel electrode 70 is electrically insulated from the common electrode 30, wherein the pixel electrode 70 and the common electrode 30 can be stacked on each other or can be arranged in the same layer. Specifically, when the pixel electrode 70 and the common electrode 30 are stacked on each other, the array substrate of the present application can be used in a fringe-field switching (FFS) liquid crystal display. For example, the pixel electrode 70 can be disposed over the common electrode 30, or the pixel electrode 70 can also be disposed below the common electrode 30. When the pixel electrode 70 and the common electrode 30 are disposed in the same layer, that is, the pixel electrode 70 and the common electrode 30 are produced using the same material and the same process, the array substrate of the present application can be used in an in-plane switching (IPS) liquid crystal display.

Figure 2:
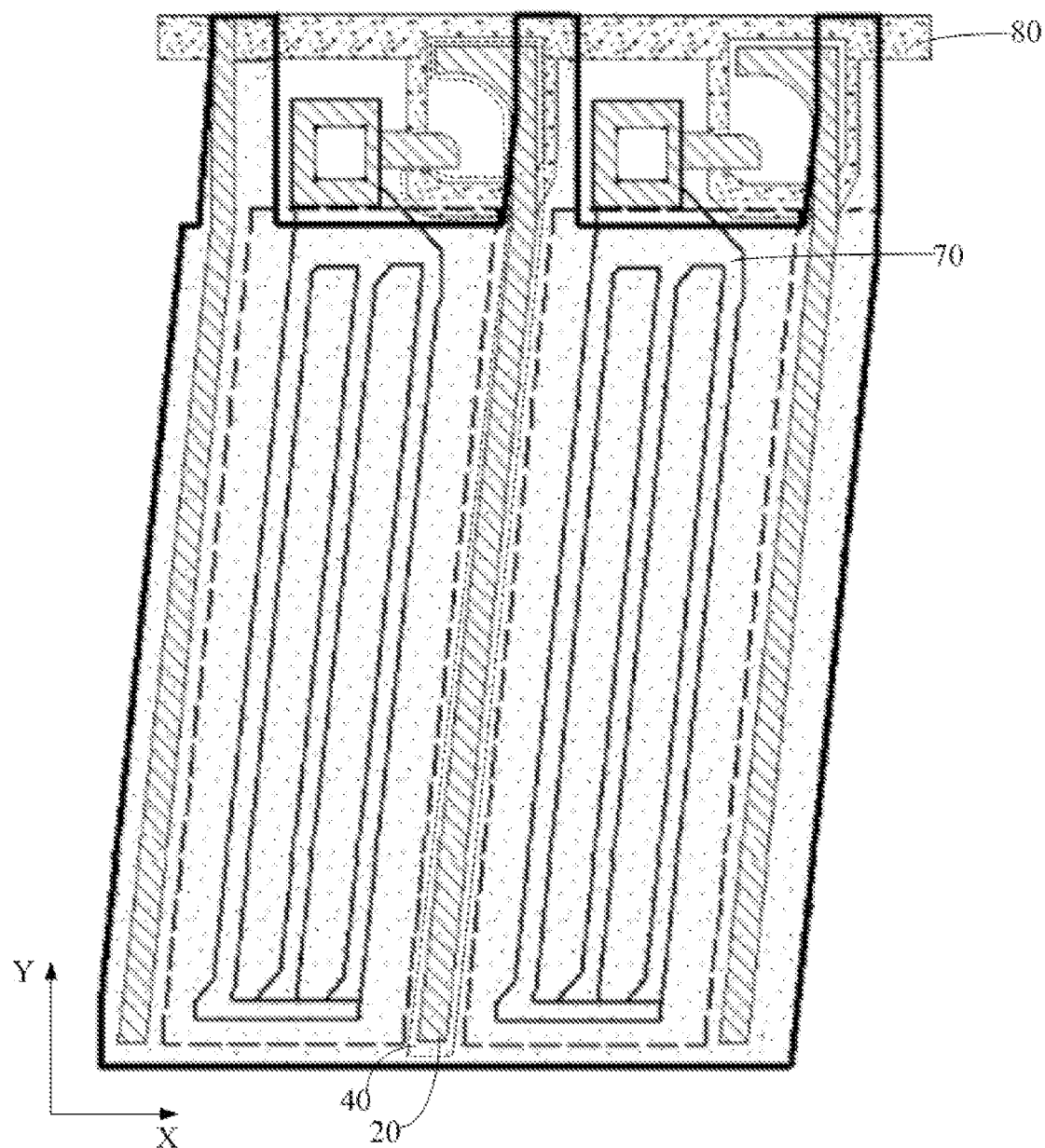
FIG. 2 is a schematic top view of the array substrate according to one embodiment of the present application.
Figure 3:
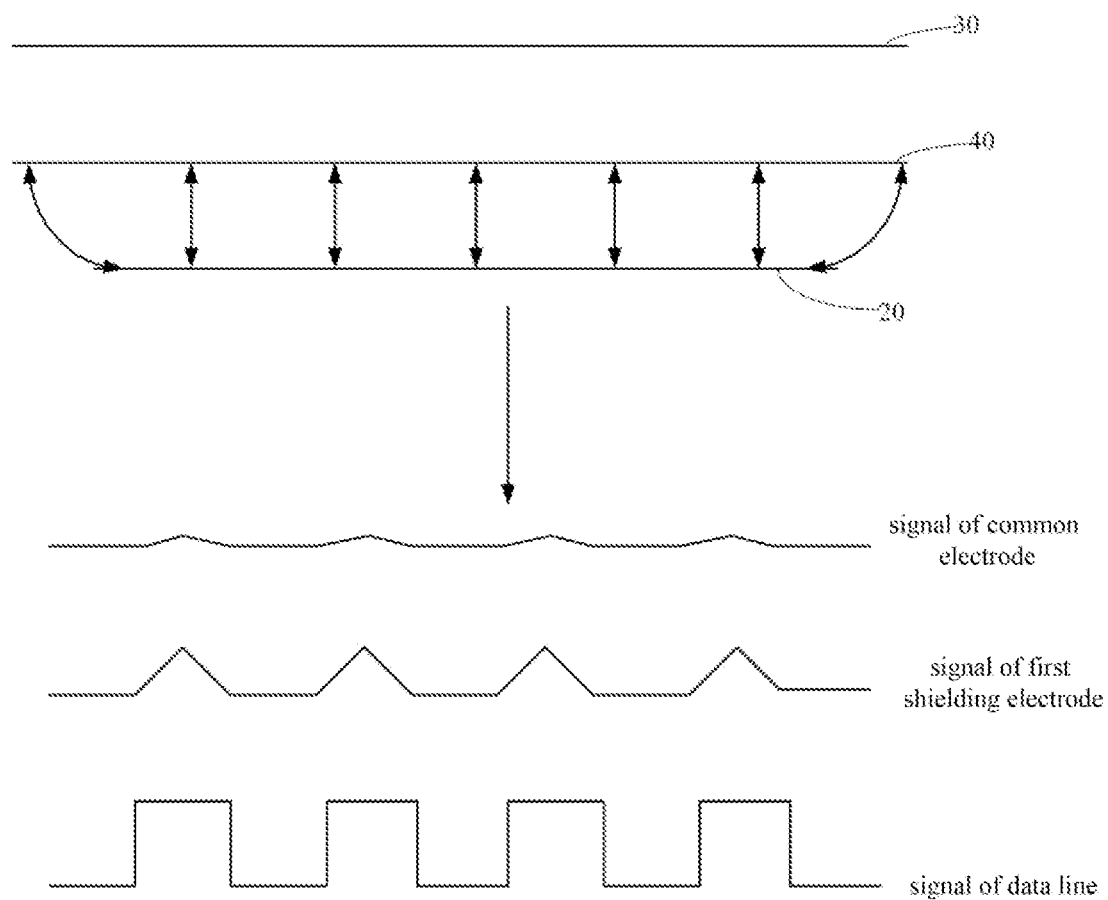
FIG. 3 is a schematic view illustrating working principles of the array substrate according to one embodiment of the present application.

With reference to FIG. 1 to FIG. 3, in the array substrate of the present application, the gate insulating layer 114, the first passivation layer 50, and the second passivation layer 60 are arranged to electrically insulate the data line 20, the first shielding electrode 40, and the common electrode 30 from each other. A portion of the common electrode 30 is arranged to overlap with the data line 20 and the first shielding electrode 40, so that the first shielding electrode 40 is formed between the data line 20 and the common electrode 30 arranged opposite to each other. The first shielding electrode 40 is connected to the DC voltage signal output terminal, so that the first shielding electrode 40 is connected to the DC voltage signal. Through a shielding effect of the first shielding electrode 40 on the data line 20, a weak electric field or no electric field is formed between the first shielding electrode 40 and the common electrode 30, which is beneficial to prevent coupling capacitance between the common electrode 30 and the data line 20. Accordingly, the data voltage signal of the data line 20 does not affect a signal of the common electrode 30. No matter how the data voltage signal changes, voltage in every position of the plate-shaped common electrode 30 can always remain the same, which is beneficial to maintain the uniformity of the voltage of the common electrode 30 and prevents corresponding liquid crystals above the data line 20 from constantly rotating and deflecting to cause screen flickering as the voltage of the common electrode 30 changes.

In some embodiments of the present application, the DC voltage signal refers to a signal that maintains a DC voltage within a frame period. Specifically, the DC voltage signal in the DC voltage signal output terminal includes any one of a ground signal (GND), a high-level signal (VGH), or a low-level signal (VGL). Stability of the signal of the first shielding electrode 40 can be ensured by connecting the first shielding electrode 40 to the DC voltage signal such as a ground signal (GND), a high-level signal (VGH), or a low-level signal (VGL). This is beneficial to prevent a voltage signal of the common electrode 30 from having voltage fluctuation due to frequency changes of an alternating current (AC) voltage. Accordingly, the present application can ensure the first shielding electrode 40 provides good shielding effects.

In some embodiments, an area of an orthographic projection of the first shielding electrode 40 projected on the substrate 10 covers an area of an orthographic projection of the data line 20 projected on the substrate 10. Therefore, it can be ensured that under the shielding effect of the first shielding electrode 40, there is no electric field between the data line 20 and the common electrode 30. That is to say, no coupling capacitance is formed between the data line 20 and the common electrode 30, and voltage stability of the plate-shaped common electrode 30 can be maintained, thereby preventing poor display like screen flickering.

Figure 4:
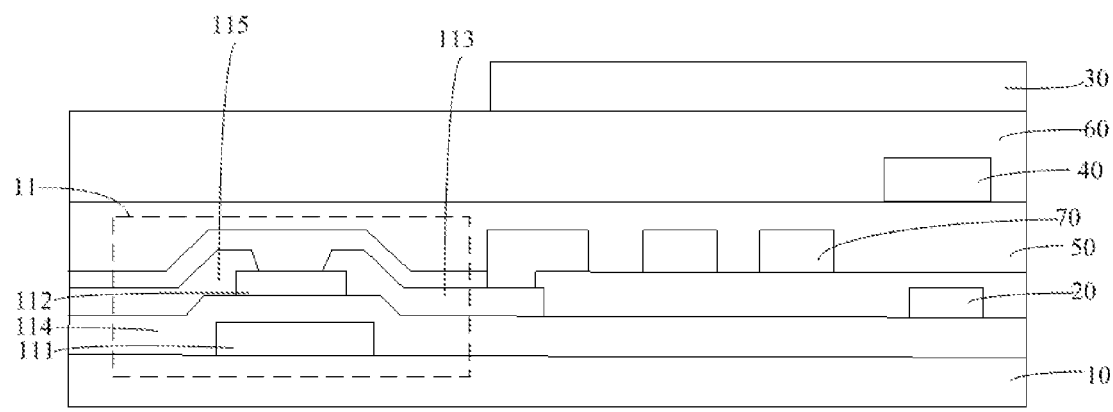
FIG. 4 is a schematic structural view of a first shielding electrode of the array substrate according to one embodiment of the present application.
Figure 5:
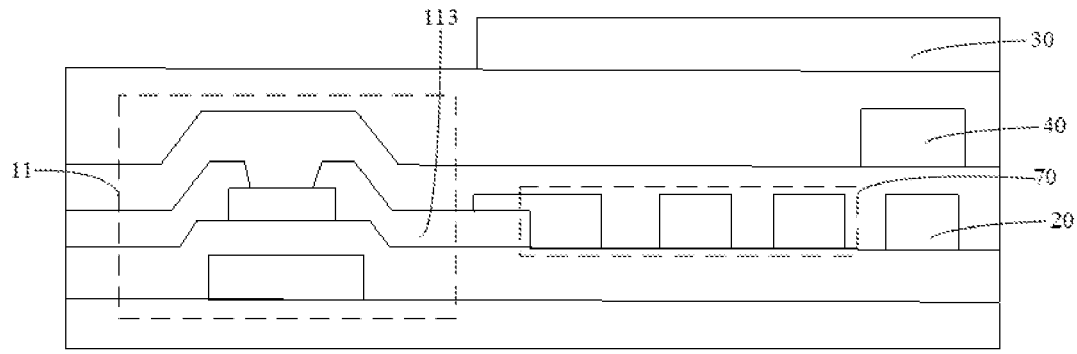
FIG. 5 is a schematic structural view of the first shielding electrode of the array substrate according to another embodiment of the present application.

In some embodiments, as shown in FIG. 4, the array substrate further includes a thin film transistor 11.

The thin film transistor 11 has a gate 111, a gate insulating layer 114, an active layer 112, and a source 115 and a drain 113 sequentially arranged from bottom to top along a thickness direction of the array substrate. The data line 20, the drain 113, and the source 115 are disposed in the same layer. The scan line 80 is disposed in the same layer as the gate electrode 111. The scan line 80 is disposed under the gate insulating layer 114, and the data line 20 is disposed above the scan line 80. The pixel electrode 70 is connected to the drain 113. The first shielding electrode 40 and the pixel electrode 70 are disposed in different layers. In a case where the array substrate of the present application is used in a liquid crystal display panel, the thin film transistor 11 is used as a switch of a sub-pixel in the display panel, the gate 111 of the thin film transistor 11 is connected to the scan line 80 of the display panel, and scan driving signals are provided through the scan line 80 connected to a scan circuit. The source 115 of the thin film transistor 11 is connected to the data line 20, and data voltage signals are provided through the data line 20 connected to a driving chip or a flexible circuit board. The drain 113 of the thin film transistor 11 is connected to the pixel electrode 70, and the data voltage signals are sent to the pixel electrode 70 through the data line 20. The common electrode 30 is connected to a common potential. A driving electric field in an FFS mode or an IPS mode is formed between the pixel electrode 70 of each sub-pixel and the common electrode 30. The driving electric field controls rotation of liquid crystal molecules in a liquid crystal layer. Light provided by a backlight module passes through the array substrate of the liquid crystal display panel and is refracted from the liquid crystal layer of the liquid crystal display panel. The refracted light generates a color image through a color filter substrate to complete the display.

Figure 6:
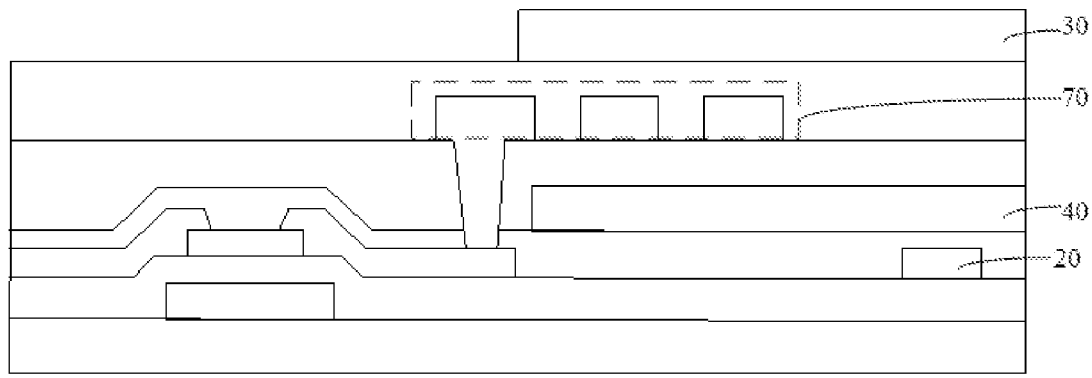
FIG. 6 is a schematic structural view of the first shielding electrode of the array substrate according to still another embodiment of the present application.

In some embodiments, as shown in FIG. 6, the first shielding electrode 40 is a plate-shaped electrode, and the pixel electrode 70 is disposed above the first shielding electrode 40. Since the pixel electrode 70 is disposed above the first shielding electrode 40, an electric field between the pixel electrode 70 and the common electrode 30 is not shielded by the first shielding electrode 40. In this case, even if the first shielding electrode 40 is plate-shaped, it does not cause interference to the pixel electrode 70, so there is no need to perform additional patterning processes on the first shielding electrode 40. Both the first shielding electrode 40 and the common electrode 30 are plate-shaped. Accordingly, in the step of producing the first shielding electrode 40, the same mask for producing the common electrode 30 can be used, which is beneficial to save manufacturing costs.

In some embodiments, the first shielding electrode 40 is a strip-shaped electrode, the common electrode 30 is disposed above the pixel electrode 70, and the first shielding electrode 40 is disposed between the pixel electrode 70 and the common electrode 30. The first shielding electrode 40 is set as a strip-shaped electrode. When there are multiple data lines 20, multiple first shielding electrodes 40 are provided, and the data lines 20 and the first shielding electrodes 40 are arranged in a one-to-one correspondence. That is to say, each of the first shielding electrodes 40 is disposed above one data line 20 and covers the same.

In some embodiments, the array substrate further includes a second shielding electrode 90. The second shielding electrode 90 is disposed between the scan line 80 and the common electrode 30. Both the scan line 80 and the common electrode 30 are electrically insulated from the second shielding electrode 90. The scan line 80 and the gate 111 are arranged in the same layer, and the data line 20 and the drain electrode 113 are arranged in the same layer, so a distance between the scan line 80 and the common electrode 30 is greater than a distance between the data line 20 and the common electrode 30. However, a voltage of the scan line 80 can still affect the common electrode 30, which can cause screen flickering. In solution, by arranging the second shielding electrode 90 between the common electrode 30 and the scan line 80, a weak electric field or no electric field is formed between the second shielding electrode 90 and the common electrode 30 through a shielding effect of the second shielding electrode 90 on the scan line 80, which is beneficial to prevent coupling capacitance between the common electrode 30 and the scan line 80, so that the scan voltage signal of the scan line 80 does not affect the signal of the common electrode 30. No matter how the scan voltage signal changes, the voltage in every position of the plate-shaped common electrode 30 can be kept the same all the time, thus preventing the corresponding liquid crystals above the scan line 80 from constantly rotating and deflecting to cause screen flickering as the voltage of the common electrode 30 changes.

Figure 7:
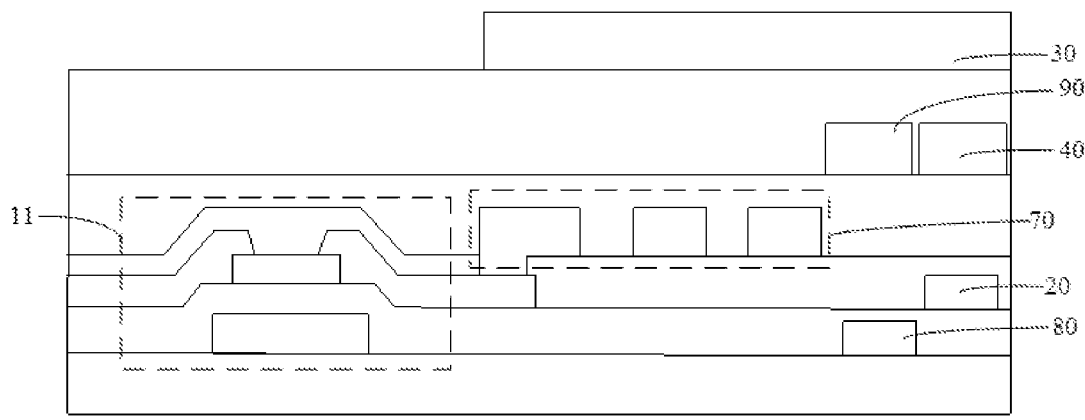
FIG. 7 is a schematic structural view of a second shielding electrode of the array substrate according to one embodiment of the present application.

In the present application, as shown in FIG. 2 and FIG. 7, the array substrate of the present application includes multiple scan lines 80 and multiple data lines 20. The scan lines 80 extend along a first direction X, and the scan lines 80 are arranged at intervals in a second direction Y. The data lines 20 extend in the second direction Y, and the data lines 20 are arranged at intervals in the first direction X. The first direction X and the second direction Y intersect each other. Specifically, in the present application, the first direction X and the second direction Y are perpendicular to each other, the first direction X is a horizontal direction, and the second direction Y is a vertical direction. The first shielding electrode 40 is used for shielding the data line 20, and the second shielding electrode 90 is used for shielding the scan line 80. Therefore, the present application can include multiple first shielding electrodes 40 and multiple second shielding electrodes 90, and orthographic projections of the first shielding electrodes 40 projected on the substrate 10 intersect orthographic projections of the second shielding electrodes 90 projected on the substrate 10. Specifically, the second shielding electrodes 90 extend along the first direction X, and the second shielding electrodes 90 are arranged at intervals in the second direction Y. The first shielding electrodes 40 extend along the second direction Y and are arranged at intervals in the first direction X. Therefore, the first shielding electrodes 40 and the second shielding electrodes 90 form crisscrossed shielding lines in the array substrate.

In some embodiments, the first shielding electrode 40 and the second shielding electrode 90 are disposed in the same layer. Specifically, the first shielding electrode 40 and the second shielding electrode 90 can be arranged spaced apart, and the first shielding electrode 40 and the second shielding electrode 90 can also be in an integral form. The first shielding electrode 40 and the second shielding electrode 90 are arranged in the same layer. That is to say, the first shielding electrode 40 and the second shielding electrode 90 are made of the same metal layer and can simultaneously shield the data line 20 and the scan line 80, thus simultaneously preventing the data line 20 and the scan line 80 from causing voltage disturbance to the common electrode 30, thereby preventing screen flickering. In addition, the first shielding electrode 40 and the second shielding electrode 90 can be produced in the same manufacturing process. Accordingly, the present application further improves image quality without adding an additional manufacturing process, which is beneficial to improve production efficiency and save manufacturing costs.

In some embodiments, a thickness of the first shielding electrode 40 ranges from 500 angstroms to 600 angstroms. The first shielding electrode 40 can be made of a conductive metal material and made by a sputtering process. For example, the first shielding electrode 40 can be made of copper (Cu), indium tin oxide (ITO), indium gallium oxide (IZO), and other metal oxides. The thickness of the first shielding electrode 40 can be formed by controlling the time of the sputtering process. By controlling the thickness of the first shielding electrode 40 within a reasonable range, the shielding effect of the first shielding electrode 40 can be ensured, and at the same time, production efficiency of the array substrate can be improved.

It can be understood that when the thickness of the first shielding electrode 40 is thinner, the time for forming the first shielding electrode 40 by the sputtering process is also shorter, which is beneficial to shorten the production time of the first shielding electrode 40 and improve the production efficiency of the array substrate. However, if the thickness of the first shielding electrode 40 is too thin, the first shielding electrode 40 can be damaged during the production of the first shielding electrode 40, which affects the shielding effect of the first shielding electrode 40 and causes poor manufacturing quality and poor display quality. In addition, if the first shielding electrode 40 is too thin, it causes high resistance. This can cause slower recovery of the potential of the first shielding electrode 40 after a coupling effect between the first shielding electrode 40 and the data line 20, thereby leading to a horizontal crosstalk problem. When the thickness of the first shielding electrode 40 is greater, the resistance of the first shielding electrode 40 does not become too low, and it is not easy to cause defects, but correspondingly, it takes a longer time for forming the first shielding electrode 40 by the sputtering process. This is not conducive to improving the production efficiency of the array substrate, and is also not conducive to the overall thinning of the array substrate.

In addition, in the present application, the second shielding electrode 90 can also be made of a conductive metal material and made by a sputtering process. For example, the first shielding electrode 40 can be made of copper (Cu), indium tin oxide (ITO), indium gallium oxide (IZO), and other metal oxides. A thickness of the second shield electrode 90 can range from 500 angstroms to 600 angstroms. The material and the thickness of the second shielding electrode 90 can be the same as or different from the material and the thickness of the first shielding electrode 40, which are not specifically limited herein.

In order to better carry out the array substrate of the present application, the present application further provides a display device. The display device includes the above-mentioned array substrate. The display device of the present application can be a liquid crystal display device, and includes an array substrate, a liquid crystal layer, and a color filter substrate. The liquid crystal layer is arranged between the array substrate and the color filter substrate. In the display device of the present application, the gate insulating layer 114, the first passivation layer 50, and the second passivation layer 60 are arranged to electrically insulate the data line 20, the first shielding electrode 40, and the common electrode 30 from each other. A portion of the common electrode 30 overlaps with the data line 20 and the first shielding electrode 40, and the first shielding electrode 40 is disposed between the data line 20 and the common electrode 30 disposed opposite to each other, and the first shielding electrode 40 is connected to the DC voltage signal output terminal so that the first shielding electrode 40 is connected to the DC voltage signal. Due to the shielding effect of the first shielding electrode 40 on the data line 20, a weak electric field or no electric field is formed between the first shielding electrode 40 and the common electrode 30. This is beneficial to prevent coupling capacitance between the common electrode 30 and the data line 20, so that the data voltage signal of the data line 20 does not affect the signal of the common electrode 30. No matter how the data voltage signal changes, the voltage in every position of the plate-shaped common electrode 30 can always be kept the same. In other words, it is beneficial to maintain the uniformity of the voltage of the common electrode 30, and prevent the corresponding liquid crystals above the data line 20 from constantly rotating and deflecting to cause screen flickering as the voltage of the common electrode 30 changes.

Since the display device has the above-mentioned display panel, it has the same advantages, which are not repeated herein. The present application do not specifically limit the applications of the display device. The display device are, for example, handheld devices (smartphones, tablet computers, etc.), wearable devices (smart bracelets, wireless earphones, smart watches, smart glasses, etc.), in-vehicle devices (navigators, parking assist systems, driving recorders, car refrigerators, etc.), virtual reality devices, augmented reality devices, terminal devices, etc.

In the above-mentioned embodiments, the description of each embodiment has its own emphasis. For those that are not described in detail in a certain embodiment, reference can be made to the relevant descriptions in other embodiments. In practice, the above units or structures can be realized as independent entities, or can be arbitrarily combined to be realized as the same or several entities. For the specific practice of the above units or structures, reference can be made to the foregoing embodiments, and a detailed description is not repeated for brevity.

An array substrate and a display device of the present application have been introduced in detail above. The working principles and embodiments of the present application are described in the present disclosure by using specific examples. The descriptions of the above embodiments are only used for ease of understanding the technical solutions and main ideas of the present application. Those of ordinary skill in the art can modify the technical solutions in the foregoing embodiments, or perform equivalent replacements to some of the technical features. These modifications or replacements do not deviate from the protection scope of the technical solutions of the embodiments of the present application.

What is claimed is:

1. An array substrate, comprising:
a substrate;
a gate insulating layer disposed on the substrate;
a data line disposed on the gate insulating layer;
a first passivation layer disposed on the gate insulating layer and covering the data line;
a first shielding electrode disposed on the first passivation layer, wherein the first shielding electrode is connected to a direct current (DC) voltage signal output terminal, and an area of an orthographic projection of the first shielding electrode projected on the substrate completely covers an area of an orthographic projection of the data line projected on the substrate;
a second passivation layer disposed on the first passivation layer and covering the first shielding electrode;
a common electrode disposed on the second passivation layer, wherein a portion of the common electrode overlaps with the data line and the first shielding electrode;
a pixel electrode arranged in a same layer as the common electrode or arranged in stacked relation with the common electrode, wherein the pixel electrode is electrically insulated from the common electrode;
a scan line disposed on the substrate and arranged under the gate insulating layer; and
a second shielding electrode arranged between the scan line and the common electrode, wherein the scan line and the common electrode are electrically insulated from the second shielding electrode, an area of an orthographic projection of the second shielding electrode projected on the substrate completely covers an area of an orthographic projection of the scan line projected on the substrate, and the first shielding electrode and the second shielding electrode are disposed in a same layer.

2. The array substrate according to claim 1, wherein a DC voltage signal of the DC voltage signal output terminal comprises any one of a ground signal, a high-level signal, or a low-level signal, and the DC voltage signal is a signal that maintains a DC voltage within a frame period.

3. The array substrate according to claim 1, wherein the first shielding electrode is a plate-shaped electrode, the pixel electrode is disposed on the first shielding electrode, and the common electrode is vertically aligned with and corresponds in shape with the first shielding electrode.

4. The array substrate according to claim 1, wherein the first shielding electrode is a strip-shaped electrode, the common electrode is disposed above the pixel electrode, and the first shielding electrode is disposed between the pixel electrode and the common electrode.

5. The array substrate according to claim 1, wherein an orthographic projection of the first shielding electrode projected on the substrate and an orthographic projection of the second shielding electrode projected on the substrate cross each other.

6. The array substrate according to claim 1, wherein a thickness of the first shielding electrode ranges from 500 angstroms to 600 angstroms.

7. The array substrate according to claim 1, wherein a thickness of the second shielding electrode ranges from 500 angstroms to 600 angstroms.

8. The array substrate according to claim 1, wherein the first shielding electrode and the second shielding electrode are made of at least one of copper, indium tin oxide, or indium gallium oxide.

9. The array substrate according to claim 1, wherein the first shielding electrode and the second shielding electrode are formed by a sputtering process.

10. A display device, comprising an array substrate, a liquid crystal layer, and a color filter substrate, wherein the liquid crystal layer is disposed between the array substrate and the color filter substrate, and the array substrate comprises:
- a substrate;
- a gate insulating layer disposed on the substrate;
- a data line disposed on the gate insulating layer:
- a first passivation layer disposed on the gate insulating layer and covering the data line;
- a first shielding electrode disposed on the first passivation layer, wherein the first shielding electrode is connected to a direct current (DC) voltage signal output terminal, and an area of an orthographic projection of the first shielding electrode projected on the substrate completely covers an area of an orthographic projection of the data line projected on the substrate;
- a second passivation layer disposed on the first passivation layer and covering the first shielding electrode;
- a common electrode disposed on the second passivation layer, wherein a portion of the common electrode overlaps with the data line and the first shielding electrode;
- a pixel electrode arranged in a same layer as the common electrode or arranged in stacked relation with the common electrode, wherein the pixel electrode is electrically insulated from the common electrode;
- a scan line disposed on the substrate and arranged under the gate insulating layer; and
- a second shielding electrode arranged between the scan line and the common electrode, wherein the scan line and the common electrode are electrically insulated from the second shielding electrode, an area of an orthographic projection of the second shielding electrode projected on the substrate completely covers an area of an orthographic projection of the scan line projected on the substrate, and the first shielding electrode and the second shielding electrode are disposed in a same layer.

11. The display device according to claim 10, wherein the DC voltage signal of the DC voltage signal output terminal comprises any one of a ground signal, a high-level signal, or a low-level signal, and the DC voltage signal is a signal that maintains a DC voltage within a frame period.

12. The display device according to claim 10, wherein the first shielding electrode is a plate-shaped electrode, the pixel electrode is disposed above the first shielding electrode, and the common electrode is vertically aligned with and corresponds in shape with the first shielding electrode.

13. The display device according to claim 10, wherein the first shielding electrode is a strip-shaped electrode, the common electrode is disposed on the pixel electrode, and the first shielding electrode is disposed between the pixel electrode and the common electrode.

14. The display device according to claim 10, an orthographic projection of the first shielding electrode projected on the substrate and an orthographic projection of the second shielding electrode projected on the substrate cross each other.

* * * * *